Patented July 29, 1952

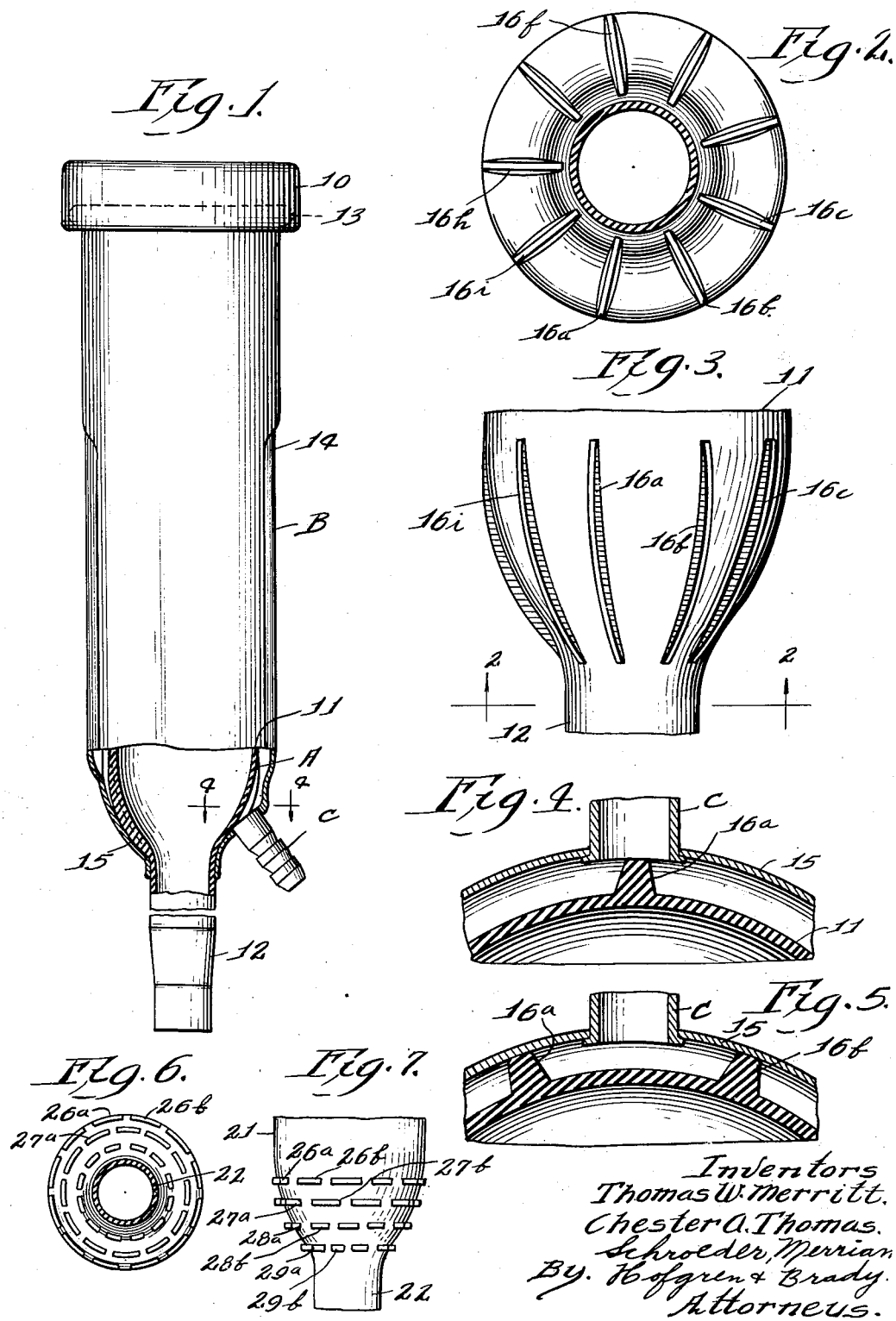

2,604,873

UNITED STATES PATENT OFFICE 2,604,873

INFLATION FOR MILKERS

Thomas W. Merritt, St. Charles, and Chester A. Thomas, Lake Forest, Ill., assignors to Babson Bros. Co., a corporation of Illinois Application July 14, 1949, Serial No. 104,732

4 Claims. (Cl. 119—14.53)

This invention relates to a flexible inflation for use in a shell to provide a teat cup assembly for a milking machine, and to such an improved assembly.

The major feature of this invention is that it provides protuberances, preferably rib-like and circumferentially spaced, which operate to prevent restriction of air flow through the pulsator connector nipple. In previous teat cup assemblies, particularly where the connector nipple opened into the shell in the inwardly formed portion at one end, restriction of air flow sometimes occurred where the inflation was particularly flexible, or swelled slightly. In either case on the vaccum portion of the cycle when air was being withdrawn from the space between the inflation and shell, we have discovered that the inflation sometimes restricted flow through the connector nipple opening sufficiently to make the action sluggish. The provision of protuberances, with provision for longitudinal air movement at all times between such protuberances, proves to completely overcome any such difficulty. Other features and advantages of this invention will be apparent from the following specification and the drawings in which:

Figure 1 is a view, principally in side elevation but partly in section of a teat cup assembly embodying our invention; Figure 2 is a transverse enlarged sectional view on the line 2—2 of Figure 3; Figure 3 is a partial enlarged side elevation of a portion of the inflation, particularly that portion where the body forms in to join with the stem; Figure 4 is an enlarged fragmentary sectional view along the line 4—4 of Figure 1; Figure 5 is an enlarged sectional view similar to Figure 4, but with the inflation somewhat circumferentially displaced; Figure 6 is a view similar to Figure 2, but of a modified or alternate form of our invention; and Figure 7 is a partial side elevation similar to Figure 3, but of the alternate form shown in Figure 6.

In milking a cow by machine, vacuum is applied to the opening at the lower end of the teat to draw milk out of the teat and out of the cistern or reservoir immediately thereabove. In order to provide stimulation and to prevent injury to the teat and udder, it is desirable to massage or compress the teat and periodically to close off the flow of milk there-through. This is accomplished in present commercial milking machines by providing a flexible enclosing element for the teat, termed an inflation, with a suction and milk discharge tube connected to the milker bucket; and by enclosing the inflation in a rigid shell and alternately providing conditions of vacuum and of atmospheric pressure in the shell to the outside of the inflation.

When substantially equal vacuums are applied both to the outside and the inside of the inflation, the inflation is then in what may be termed unstressed condition, and the vacuum present in the discharge tube acts upon the teat to withdraw milk therefrom and from the reservoir thereabove. On the other hand, when atmospheric pressure is present in the shell to the outside of the inflation, the pressure differential between the inside and the outside of the inflation may be in the neighborhood of five to eight pounds per square inch, resulting in the inflation squeezing inwardly sufficiently to shut off any flow of milk through the teat. This period of cessation of milk flow, which may be termed the "rest" period, permits the reservoir to refill from other portions of the udder connected to the reservoir by branching channels and ducts; and this "giving down" of the milk, as it is generally termed in the dairy industry, is encouraged by the stimulus caused by mechanical gripping and releasing of the teat, which may, of course, be combined with other stimuli, as for example a tugging action.

These alternate conditions of operation are repeated at a rate generally in the neighborhood of forty to fifty cycles per minute, the provision of vacuum and atmospheric pressure conditions in the shell being effected automatically at this rate by a portion of the milking machine termed a pulsator. The principle of applying vacuum at all times to the end of the teat, and alternately squeezing and releasing the teat to permit intermittent flow of milk therethrough is termed "double action" milking, and has been the conventional commercial method of milking machine operation for about three decades. Inasmuch as this method of milking and machines for operating in this manner are so well known, they are not illustrated and described more fully here. If it is so desired, the present description, which will hereinafter be limited to the teat cup assembly and the improvements which we have made therein, may be supplemented by reference to McCornack Patent 1,859,213, which discloses one conventional commercial type of milking machine, and Fosler Patent 1,376,804, which shows the details of operation of a pulsator therefor.

In the particular embodiment of our invention illustrated herewith in Figures 1 to 5, one teat cup assembly (four identical assemblies of this type would be used with each machine, of course)

is illustrated as comprising an inflation A, and a shell B having a vacuum or pulsator connector nipple C. The flexible inflation A, usually of a material such as natural or synthetic rubber, comprises an upper rim portion here identified in general as 10, adapted to snap over a rim at the top of the shell; a generally cylindrical main body portion 11 usually about 6 inches in length; and a stem portion here identified as 12. All of these portions are preferably integral as illustrated, the bottom of the body portion being inwardly formed to connect with the stem. The lower end (speaking with respect to the position of the inflation, as shown in the drawing) of the stem portion would be slipped over a nipple of a milker lid or of a claw and provides the milk delivery tube. As vacuum is always drawn in the milk delivery tube during a milking operation, this vacuum generally being at least 10 and normally in the neighborhood of 15 inches of mercury, vacuum is applied through the stem to the lower end of the teat which would lie in the body portion of the inflation.

The shell, of a rigid material and preferably of stainless steel, comprises an upper rim portion 13 and a main body portion 14 having an inwardly formed lower end 15 terminating closely adjacent the neck of the stem 12 of the inflation; and this inwardly formed portion of the shell is here shown as having the connector nipple C mounted therein to provide a pulsator connection opening in the shell. The connector nipple C would be connected by a flexible tube to the pulsator to intermittently communicate with vacuum and atmospheric pressure. Air in the space between the outside of the inflation A and the inside of the shell B, inasmuch as these two parts are connected together at the top and at the bottom, moves in and out through the pulsator connection opening as a function of pulsator operation. In order that the action of the inflation may be "snappy" rather than sluggish, it is desirable that this air flow be unrestricted and that air be capable of moving in and out of the connection opening through an area comprising at least a major portion of the full capacity thereof, this full opening generally being of the order of $\frac{3}{16}''$ in diameter.

As may be best seen in Figures 2 to 5, we provide positive means for insuring free flow of air in and out of the pulsator connection opening. We do this by forming, on the shoulder or inwardly formed end of the body of the inflation 11, integral rib-like protuberances which, in the figures just mentioned, extend longitudinally of the inflation, these protuberances being here identified as 16a to 16i. These protuberances must be circumferentially spaced to provide free air flow from the pulsator connection opening upwardly to and around the main body of the inflation. As may be best seen in Figure 3, we find it preferable to form these protuberances of greater height in the center of the shoulder portion and tapering to substantially nothing at either end, the center height preferably being of the order of $\frac{1}{16}''$ to $\frac{1}{8}''$. As may be best seen in Figures 4 and 5 we also find it preferable to make these rib-like protuberances somewhat of a truncated triangular cross-section, so that the outermost portions of the rib-like protuberances are of lesser width than the base portions.

It is also important that these outermost portions of the rib-like protuberances be of a width considerably less than the diameter of the pulsator connector opening. After each milking the inflation must be removed from the shell and washed, normally being replaced in the shell just before the next milking. The inflation is symmetrical in shape and it is desirable to avoid any necessity of having to replace it in the shell in any given specific relation with the pulsator connector opening. Because of this one of the protuberances might lie across the face of the opening as illustrated in Figure 4. The pulsator connection opening normally has a diameter of the order of about $\frac{3}{16}''$ and if the outermost portion of the protuberance is kept to about one-third of this diameter or less, say $\frac{1}{16}''$ or less, there will still be plenty of flow area on each side of it to ensure proper inflation action. We have also found it desirable to space the protuberances symmetrically entirely around the shoulder section of the inflation, and they should be preferably spaced at least as much as but preferably not more than two or three times the diameter of the connector opening. With this arrangement the protuberances may straddle the opening in the manner shown in Figure 5 without there being any chance of the intermediate wall portion of the inflation sagging down sufficiently to close the connection opening.

In the alternative form of our invention, shown in Figures 6 and 7, the rib-like protuberances are again placed entirely around the shoulder section of the outer wall of the inflation, but in this case the rib-like elements extend circumferentially rather than longitudinally, being formed in several rows. The protuberances are again circumferentially spaced at frequent intervals, as shown, in order to provide pathways for free vertical movement of air along the outer wall of the inflation. The space between the rib-like sections in each row should preferably be at least of the order of the pulsator connector opening; and the space between rows should be not more than two or three times such diameter. In this alternate form of the invention the body portion of the inflation 21 is formed inwardly to connect with the stem portion 22, and the protuberances are on this shoulder section, here illustrated as in four rows. The uppermost row here comprises the circumferentially extending rib-like but separated sections 26a, 26b, etc.; the next row comprises the sections 27a, 27b, etc.; the third row comprises the sections 28a, 28b, etc.; and the final row near the neck comprises the sections 29a, 29b, etc. The protuberances of the rows 27 and 28 would preferably be somewhat greater in height than those of the outer rows 26 and 29 in a manner analogous to the change in height of the rib-like protuberances shown in Figure 3. This arrangement again ensures a positively spaced support arrangement which obviates any chance of the wall section sagging onto and completely or largely closing the pulsator connection opening.

While I have shown and described certain embodiments of my invention, it is to be understood that it is capable of many modifications. Changes, therefore, in the construction and arrangement may be made without departing from the spirit and scope of the invention as disclosed in the appended claims.

We claim:

1. A flexible inflation for use in a milker teat cup shell having a pulsator connection opening therein, comprising a stem portion and a generally cylindrical body portion having an inwardly formed section at one end and adjacent said pulsator connection to join said stem portion, said inwardly formed section of said body portion having circumferentially spaced longitudinally extending rib-like protuberances thereon, such rib-like protuberance having at least the outermost portions thereof of a width less than the diameter of said connection opening and spaced farther apart than said diameter.

2. A flexible inflation for use in a milker teat cup shell having a pulsator connection opening therein, comprising a stem portion and a generally cylindrical body portion having an inwardly formed section at one end and adjacent said pulsator connection to join said stem portion, said inwardly formed section of said body portion having circumferentially spaced, longitudinally extending rib-like protuberances thereon entirely around said inflation, such rib-like protuberance having at least the outermost portions thereof of a width less than the diameter of said connection opening and spaced farther apart than said diameter, said protuberance also being tapered so as to be higher at the center portion than at the ends.

3. A flexible inflation for use in a milker teat cup shell having a pulsator connection opening therein, comprising a stem portion and a generally cylindrical body portion having an inwardly formed section at one end and adjacent said pulsator connection to join said stem portion, said inwardly formed section of said body portion having circumferentially spaced rib-like protuberances thereon entirely around said inflation, said protuberances being wider at the base than at the top and said top having a width less than the diameter of said connection opening and having an appreciable area of contact on the side wall of said teat cup shell.

4. A flexible inflation for use in a milker teat cup shell having a pulsator connection opening therein, comprising a stem portion and a generally cylindrical body portion having an inwardly formed section at one end and adjacent said pulsator connection to join said stem portion, said inwardly formed section of said body portion having circumferentially spaced longitudinally extending rib-like protuberances thereon entirely around said inflation, said protuberances being wider at the base than at the top and said top having a width less than the diameter of said connection opening and spaced farther apart than said diameter and having an appreciable area of contact on the side wall of said teat cup shell, and tapered so as to be higher in the center portion than at the ends.

THOMAS W. MERRITT.
CHESTER A. THOMAS.

REFERENCES CITED

The following references are of record in the file of this patent:

UNITED STATES PATENTS

| Number | Name | Date |
| --- | --- | --- |
| 135,391 | Way | Jan. 28, 1873 |
| 827,159 | Lane | July 31, 1906 |
| 1,111,978 | Uebler | Sept. 29, 1914 |
| 1,220,172 | Berthelsen | Mar. 27, 1917 |
| 1,256,792 | Harner | Feb. 19, 1918 |
| 1,285,079 | Eklundh et al. | Nov. 19, 1918 |
| 1,365,665 | Davies | Jan. 18, 1921 |
| 1,657,667 | Ellison | Jan. 31, 1928 |
| 1,690,327 | Dinesen | Nov. 6, 1928 |
| 2,079,435 | Dinesen | May 4, 1937 |
| 2,099,884 | Green | Nov. 23, 1937 |
| 2,340,296 | Bender | Feb. 1, 1944 |
| 2,484,696 | Dinesen | Oct. 11, 1949 |

FOREIGN PATENTS

| Number | Country | Date |
| --- | --- | --- |
| 684,726 | France | June 20, 1930 |